United States Patent [19]
Okamoto

[11] Patent Number: 5,465,083
[45] Date of Patent: Nov. 7, 1995

[54] DATA INPUT CONTROLLER FOR INHIBITING AND ENABLING INPUT

[75] Inventor: Mitsunaga Okamoto, Gunma, Japan

[73] Assignee: Sanyo Electric Co., Ltd., Osaka, Japan

[21] Appl. No.: 83,642

[22] Filed: Jun. 25, 1993

[30] Foreign Application Priority Data

Jun. 30, 1992 [JP] Japan ................................ 4-173534

[51] Int. Cl.⁶ ........................................ G06F 1/00
[52] U.S. Cl. ........................ 340/825.31; 340/825.34; 380/25
[58] Field of Search ................ 340/825.31, 825.34; 380/4, 25, 50

[56] References Cited

U.S. PATENT DOCUMENTS 5,097,506  3/1992  Kaiser, Jr. et al. ............... 340/825.31

FOREIGN PATENT DOCUMENTS 0382470  8/1990  European Pat. Off. .

*Primary Examiner*—Michael Horabik
*Attorney, Agent, or Firm*—Spensley Horn Jubas & Lubitz

[57] ABSTRACT

A data input controller which can set a keyboard to a key lock mode without affecting the operation state of a central processing unit (CPU). In the normal key input enable state, a keyboard encoder encodes a key input through the keyboard and sends the resultant data via a keyboard controller to the CPU. In this state, when a specific key combination is entered through the keyboard, the keyboard encoder detects it and sets the key lock mode. The encoded data corresponding to the subsequent key inputs is not sent to the keyboard controller. If a desired password is entered at this time, it is registered in RAM in the keyboard controller. The key lock mode is released when the registered password is entered.

8 Claims, 6 Drawing Sheets

DATA INPUT CONTROLLER FOR INHIBITING AND ENABLING INPUT

BACKGROUND OF THE INVENTION

1. Field of the Invention

This invention relates to an information processing apparatus having input devices such as a keyboard and an auxiliary input device, and more particularly, to a data input controller which controls the input devices for inhibiting and enabling an input.

2. Description of the Related An

Many information processing apparatuses such as word-processors and personal computers are provided with a security function for protecting data and programs from any processing. For example, there is a computer including a security program which is previously stored in the main memory installed in the main unit, which contains the CPU. The user can start the program, if necessary, so as to inhibit the keyboard and auxiliary input device from operating. In this example, when the user enters any desired password through the keyboard, the password is encoded by an encoder, then stored in a keyboard controller or the main memory. In response to the password entry, the CPU outputs a command which causes the keyboard controller to stop its function. Then, the key lock mode is entered and the subsequent data input through the keyboard or auxiliary input device is inhibited.

On the other hand, to release the data input inhibition state, the user should enter the password through the keyboard, and the password is collated with the password stored in the main memory. If they match, the key lock mode is released.

Thus, formerly, to inhibit data input through the keyboard or auxiliary input device and set the key lock mode, a security program had to be prestored in the main memory in the main unit and executed for inhibiting and enabling data input under the control of the CPU.

However, in a case in which an operator leaves his or her seat during execution of an application program on the computer, somebody may press any key of the keyboard attached to the computer by mistake or intentionally, so that the operation of the application program stops or the application program brings an erroneous result. Therefore, in such a case, the operator needs to suspend or terminate the application program before leaving his or her seat, then start the security program for disabling the function of the keyboard or auxiliary input device. When the operator leaves his or her seat event briefly, he or she needs to take steps to suspend or terminate the application program, which is very troublesome for the user.

SUMMARY OF THE INVENTION

Accordingly, it is an object of the invention to provide a data input controller which can easily disable data input through a keyboard and an auxiliary input device such as a mouse while the execution of an application program is maintained.

To this end, according to one embodiment of the invention, there is provided a data input controller in an information processing apparatus comprising a central processing unit which controls the entire apparatus and performs various operations, a keyboard for entering data, and the data input controller which controls sending of data corresponding to a key input through the keyboard to the central processing unit. The data input controller includes:

key input detection means for detecting whether or not a specific key combination is entered through the keyboard;

means for inhibiting sending of data to the central processing unit when the key input detection means detects the specific key combination entry;

password registration means for registering as a password, data entered through the keyboard after data sending is inhibited by the data sending inhibition means; and release means for determining whether or not data entered through the keyboard matches the registered password if it is registered, and when they match, for releasing the data sending inhibition state.

When the specific key combination is entered through the keyboard, the data input controller sets the key lock mode and inhibits sending of data corresponding to a key input to the central processing unit, then registers the subsequently pressed key sequence as a password. The key lock mode is released when the password is entered.

The data input controller may further include state indicator means whose indicator state changes in response to the specific key combination entry and password registration.

The data input controller uses the state indicator means to display the state such as the data sending enable state to the central processing unit, the password entry wait state, or the key lock mode after password registration.

The data input controller may allow the specific key combination detected by the key input detection means to contain a key not originally used for data input to the central processing unit.

In the data input controller, a key not originally used for data input to the central processing unit is also used to make the specific key combination for key lock setting.

According to another embodiment of the invention, there is provided a data input controller in an information processing apparatus comprising a central processing unit which controls the entire apparatus and performs various operations, a keyboard and an auxiliary input device for entering data, and the data input controller which controls sending of data corresponding to a key input through the keyboard to the central processing unit. The data input controller includes:

key input detection means for detecting whether or not a specific key combination is entered through the keyboard;

means for inhibiting sending of data corresponding to an input through the keyboard or auxiliary input device to the central processing unit when the key input detection means detects the specific key combination entry;

password registration means for registering as a password, data entered through the keyboard after data sending is inhibited by the data sending inhibition means; and release means for determining whether or not data entered through the keyboard matches the registered password if it is registered, and when they match, for releasing the data sending inhibition state.

When the specific key combination is entered, the data input controller disables inputs through the auxiliary input device such as a mouse as well as the keyboard.

According to a further embodiment of the invention, there is provided a data input controller in an information processing apparatus comprising a central processing unit which controls the entire apparatus and performs various operations, a keyboard for entering data, and a data input controller which controls the sending of data corresponding to a key input through the keyboard to the central processing unit. The data input controller includes:

key input detection means for detecting whether or not a specific key combination is entered through the keyboard;

means for inhibiting sending of data corresponding to an input through the keyboard to the central processing unit when the key input detection means detects the specific key combination entry;

means for comparing first data entered through the keyboard with second data entered through the keyboard after data sending is inhibited by the data sending inhibition means;

means for registering the keyed-in data as a password when they match as a result of the comparison by the comparison means; and release means for determining whether or not data entered through the keyboard matches the registered password if it is registered, and when they match, for releasing the data sending inhibition state.

After the transition to the data sending inhibition state, namely, the key lock mode, a password is entered through the keyboard for password setting and again entered through the keyboard for password checking. Only when they match, does the data input controller formally register it as the password.

According to another embodiment of the invention, there is provided an encoder in an information processing apparatus comprising a central processing unit which controls the entire apparatus and performs various operations, a keyboard for entering data, the encoder which encodes a key input through the keyboard, and a keyboard controller which controls sending of data encoded by the encoder to the central processing unit. The encoder includes:

means for inhibiting sending of the encoded data to the keyboard controller when a specific key combination entry is detected;

password registration means for registering as a password, data entered through the keyboard after data sending is inhibited by the data sending inhibition means; and release means for determining whether or not data entered through the keyboard matches the registered password if it is registered, and when they match, for releasing the data sending inhibition state.

When the specific key combination entry is detected, the encoder inhibits sending of encoded data to the keyboard controller and stores the subsequently keyed-in data as a password. On the other hand, when detecting the keyed-in data matching the password, the encoder releases the data sending inhibition state.

According to a further embodiment of the invention, there is provided an encoder in an information processing apparatus comprising a central processing unit which controls the entire apparatus and performs various operations, a keyboard for entering data, the encoder which encodes a key input through the keyboard, a keyboard controller which controls sending of data encoded by the encoder to the central processing unit, and an auxiliary input device connected to the keyboard controller. The encoder includes:

key lock means, when a specific key combination entry is detected, for inhibiting sending of the encoded data to the keyboard controller and for sending a control signal to disable an input through the auxiliary input device to the keyboard controller;

password registration means for registering as a password, data entered through the keyboard after encoded data sending is inhibited by the key lock means; and release means for determining whether or not data entered through the keyboard matches the registered password if it is registered, and when they match, for releasing the encoded data sending inhibition state and for sending a control signal to enable an input through the auxiliary input device to the keyboard controller.

When the specific key combination entry is detected, the encoder inhibits sending of encoded data to the keyboard controller and also sends the control signal to disable an input through the mouse to the keyboard controller, then stores the subsequently keyed-in data as a password. Then, inputs through the keyboard or mouse are disabled. When detecting the keyed in data matching the password, the encoder releases the data sending inhibition state to the keyboard controller and also sends the control signal to enable an input through the mouse to the keyboard controller. Then, inputs through the keyboard or mouse are enabled.

According to another embodiment of the invention, there is provided a data input controller in an information processing apparatus comprising a central processing unit which controls the entire apparatus and performs various operations, a keyboard and an auxiliary input device for entering data, and the data input controller which controls sending of data corresponding to a key input through the keyboard to the central processing unit. The data input controller includes:

key input detection means for detecting whether or not a specific key combination is entered through the keyboard;

means for inhibiting sending of data corresponding to an input through the keyboard to the central processing unit when the key input detection means detects the specific key combination entry;

means for comparing first data entered through the keyboard with second data entered through the keyboard after data sending is inhibited by the data sending inhibition means;

control means, when they match as a result of the comparison by the comparison means, for registering the keyed-in data as a password and disabling an input through the auxiliary input device; and release means for determining whether or not data entered through the keyboard matches the registered password if it is registered, and when they match, for releasing the encoded data sending inhibition state and for sending a control signal to enable an input through the auxiliary input device to the keyboard controller.

DESCRIPTION OF THE PREFERRED EMBODIMENTS

Referring now to the accompanying drawings, there is shown a preferred embodiment of the invention.

Figure 1:
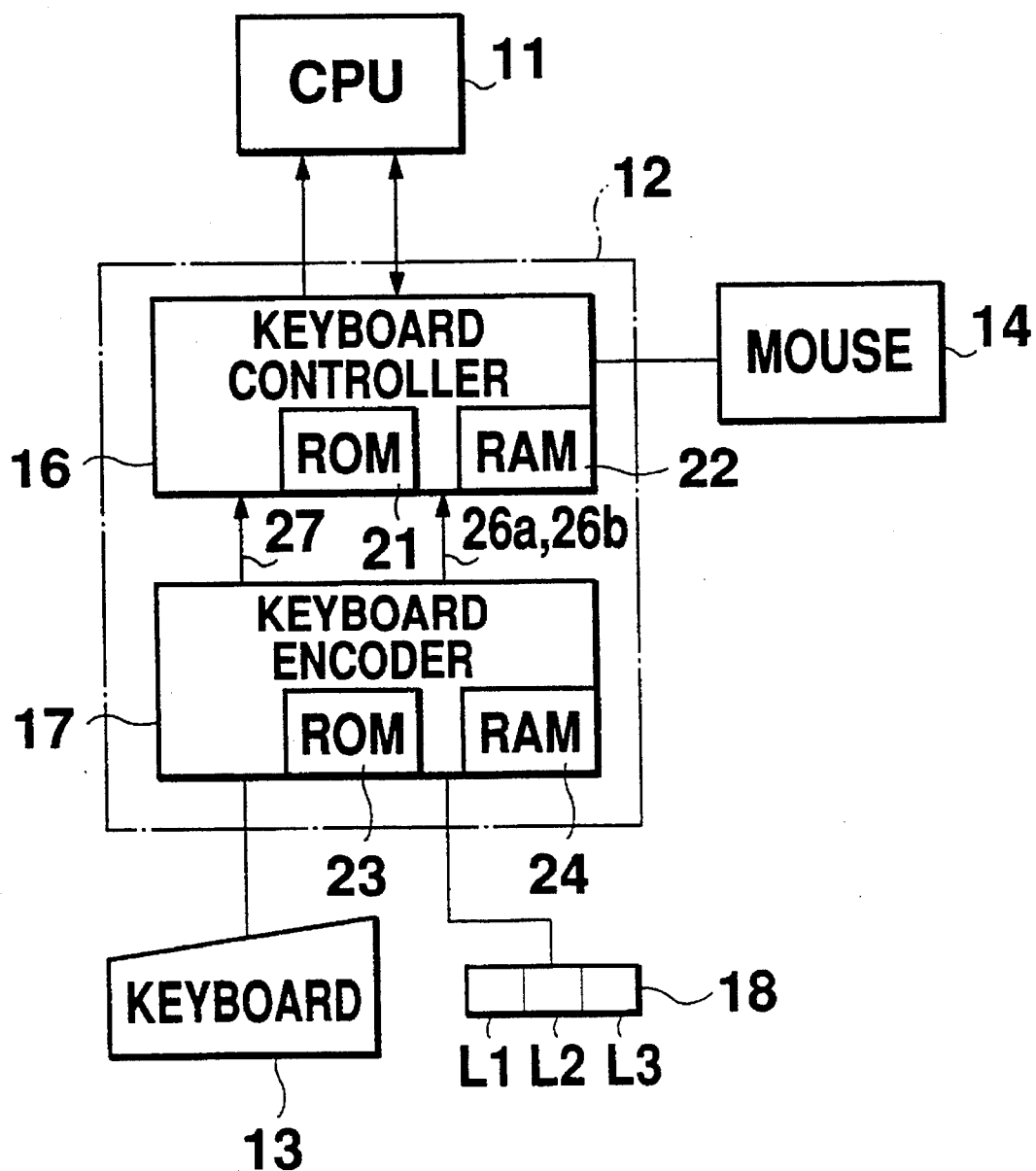
FIG. 1 is a block diagram showing a data input controller and its periphery according to one embodiment of the invention.

FIG. 1 shows the configuration of a data input controller and its periphery according to one embodiment of the invention.

As shown in the figure, a data input controller 12 includes a keyboard controller 16 and a keyboard encoder 17. The keyboard controller 16 contains a ROM 21 which stores a program to control the operation of the controller 16 and a RAM 22 which stores necessary data for outputting a serial input from a mouse 14 or the keyboard encoder 17 to a CPU 11 as parallel output. The CPU 11 controls the entire operation of an information processing apparatus (not shown), such as a word processor or a personal computer, and is connected to a main memory and other devices such as a floppy disk drive (not shown).

The keyboard encoder 17 contains a ROM 23 which stores a program to control the operation of the encoder 17 and a RAM 24 which stores a password described below. The keyboard encoder 17 encodes a key input through the keyboard 13 and outputs the code to the keyboard controller 16 as a key code 27. A LED unit 18 having three LEDs L1–L3 is connected to the keyboard encoder 17 via a driver circuit (not shown).

The operation of the data input controller thus configured is described in conjunction with the accompanying drawings of FIG. 2–5.

The invention has a feature of inhibiting and enabling input through the keyboard 13 or mouse 14 regardless of how the CPU 11 operates. First, the keyboard encoder 17 monitors a key input through the keyboard 13. When a key input is made (Y at step S101 in FIG. 2), the keyboard encoder 17 encodes the key input to generate a key code at step S102. Next, the key input detection circuit 17a in the keyboard encoder 17 determines whether or not the operation mode is the password input mode at step S103, whether or not it is the password check mode at step S104, and whether or not it is the key lock mode at step S105. Assume that the keyboard encoder 17 does not assume any of these modes (N at steps S103–S105), namely, it is the normal mode. Then, the keyboard encoder 17 determines whether or not the pressed keys form a key combination for setting the key lock mode at step S106. If the pressed keys do not form the key combination for setting the key lock mode, the keyboard encoder 17 sends the key code 27 provided by encoding the key input, to the keyboard controller 16 at step S107.

On the other hand, if the pressed keys form the key combination for setting the key lock mode (Y at step S106), the keyboard encoder 17 sets the mode to password input and stores the L1, L2, L3 state of the LED unit 18, then blinks L1 of the LED unit 18 at step S108 and sets variable n to 1 for monitoring a succeeding key input. This means that after the key combination setting the key lock mode is entered, sending of key code to the keyboard controller 16 is inhibited. After this, sending of key code from the keyboard encoder 17 to the keyboard controller 16 is inhibited until the key lock is released at step S405 in FIG. 5. As the key combination for setting the key lock mode at step S106, for example, it is convenient to use a combination of an FN key (function key) and any other predetermined key. The FN key is a special key not used for data input to the CPU 11. Therefore, it is previously programmed in the keyboard encoder 17 that key data, when the FN key is pressed, is encoded by the keyboard encoder 17, but the key code is not sent to the keyboard controller 16. Even when the CPU 11 is executing some application program, an input of the FN key for setting the key lock mode does not affect the application program. In fact, the combination of the FN key and the predetermined key is detected by comparing the key codes of the FN key and the predetermined key with two key codes previously set in the ROM 23 by key scan each time they are input.

When the pressed key sequence is judged to be the key combination for setting the key lock mode at step S106 and the password input mode is set, L1 of the LED unit 18 blinks to inform the operator that the password input mode has been set, as described above. When recognizing that the keyboard encoder 17 assumes the password input mode, the operator enters a password of a desired number of characters. As described above, the keyboard encoder 17 encodes the key input to generate key codes (step S102). At this time, the password input mode has been entered (H at step S103), thus the operation flow moves to the process shown in FIG. 3.

Figure 3:
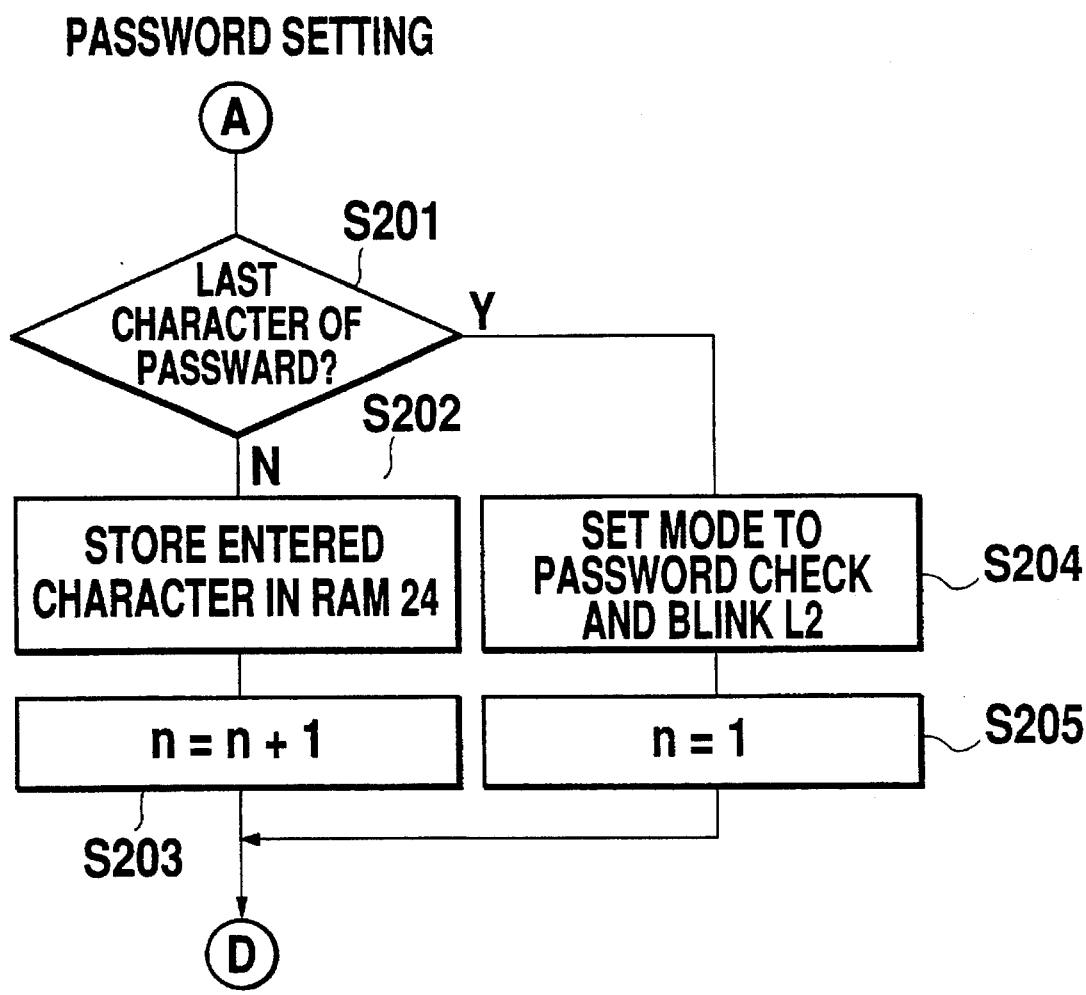
FIG. 3 is a flowchart showing a process when a password is set.

In FIG. 3, the keyboard encoder 17 determines whether or not the input key code is a code indicating the last character of the password at step S201. For example, the ENTER key or return key can be used for the last character of the password. That is, password input is completed by pressing the ENTER or return key after the password of a desired number of digits is entered.

If the pressed key is not the ENTER key at step S201, the code of the entered character is stored in the RAM 24 at step S202, and the variable n is incremented by one at step S203. A sequence of steps S101–S103 in FIG. 2 and steps S201–S203 in FIG. 3 are repeated. When the ENTER key is pressed (H at step S201), the keyboard encoder 17 is changed over to the password check mode, blinks the second LED of the LED unit 18, L2, at step S204, and sets the variable n to 1 at step S205.

From the blinking of the second LED of the LED unit 18, L2, the operator recognizes that the password input terminates and the transition is made to the password check mode. To check the password, the operator should enter the same password as that already stored in the RAM 24. The keyboard encoder 17 encodes the pressed keys to generate key codes (step S102), as described above. AT the time, the password check mode is entered (H at step S104), thus the operation flow moves to the process shown in FIG. 4.

Figure 4:
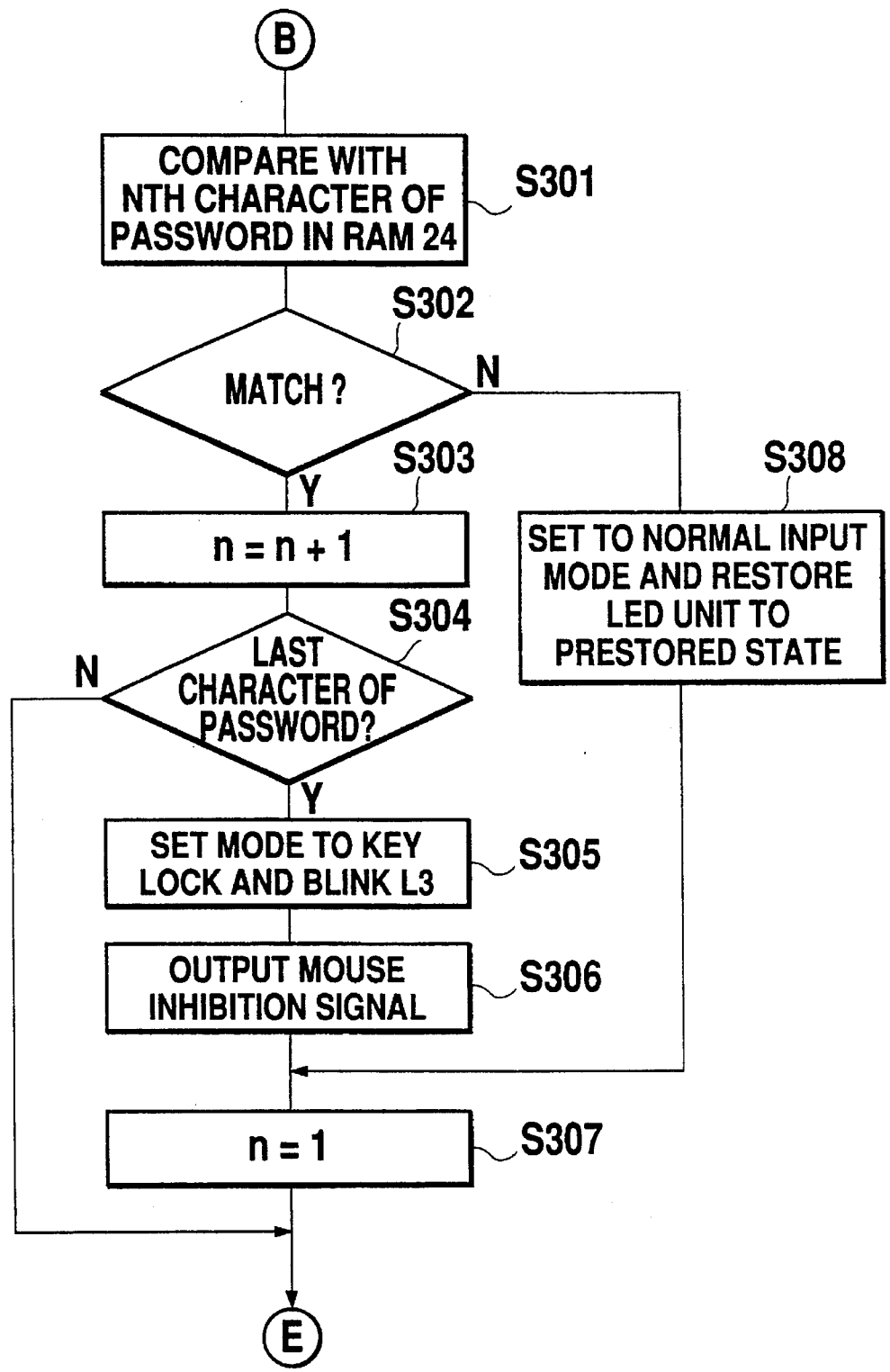
FIG. 4 is a flowchart showing operation for password check and key lock setting.

In FIG. 4, the keyboard encoder 17 compares at step S301 the nth character code of the password stored in the RAM 24 (n=1 at the beginning) with the entered key code. If they match (Y at step S302), the check board encoder 17 increments n by one at step S303, then determines whether or not the entered key code is the last character of the password, namely, the code corresponding to the ENTER key at step S304. If it is not the ENTER key (N at step S304), again the flow returns to the next key input step in FIG. 2. A sequence of steps S101–S103 in FIG. 2 and steps S301–S303 in FIG. 4 are repeated to check the password. When the ENTER key is pressed (Y at step S304), the keyboard encoder 17 recognizes that the previously registered password has been again entered correctly, and adopts the entered password formally, then is changed over to the key lock mode and blinks the third LED of the LED unit 18, L3, at step S305. Further, the keyboard encoder 17 sends a mouse inhibition signal 26a in FIG. 1 to the keyboard controller 16 at step S306 and sets the variable n to 1 at step S307.

On the other hand, if any key codes entered for check does not match the previously entered password at step S302, keyboard encoder 17 is returned to the normal input mode and the LED unit 18 is restored to the prestored state at step S308. In this case, the operator should again start the process at the step of entering the specific key combination for setting the key lock mode.

After a password entry, the operator is prompted to again enter the password and a check is made to see if they match. This advantageously prevents the operator from erroneously memorizing the password recognized by the keyboard encoder 17, in which case, the key lock mode cannot be released later by entering the password.

The keyboard controller 16, which receives the mouse inhibition signal 26a output at step S306, disables the function of sending an input through the mouse 14 to the CPU 11. Thus, sending of the input through the keyboard 13 to the keyboard controller 16 is inhibited by the keyboard encoder 17 and sending of the input through the mouse 14 to the CPU 11 is inhibited by the keyboard controller 16. Therefore, when the CPU 11 is executing an application program, even if the operator or someone operates the keyboard 13 or the mouse 14 intentionally or carelessly in this state, the CPU 11 is not affected and can continue to execute the application program.

Figure 2:
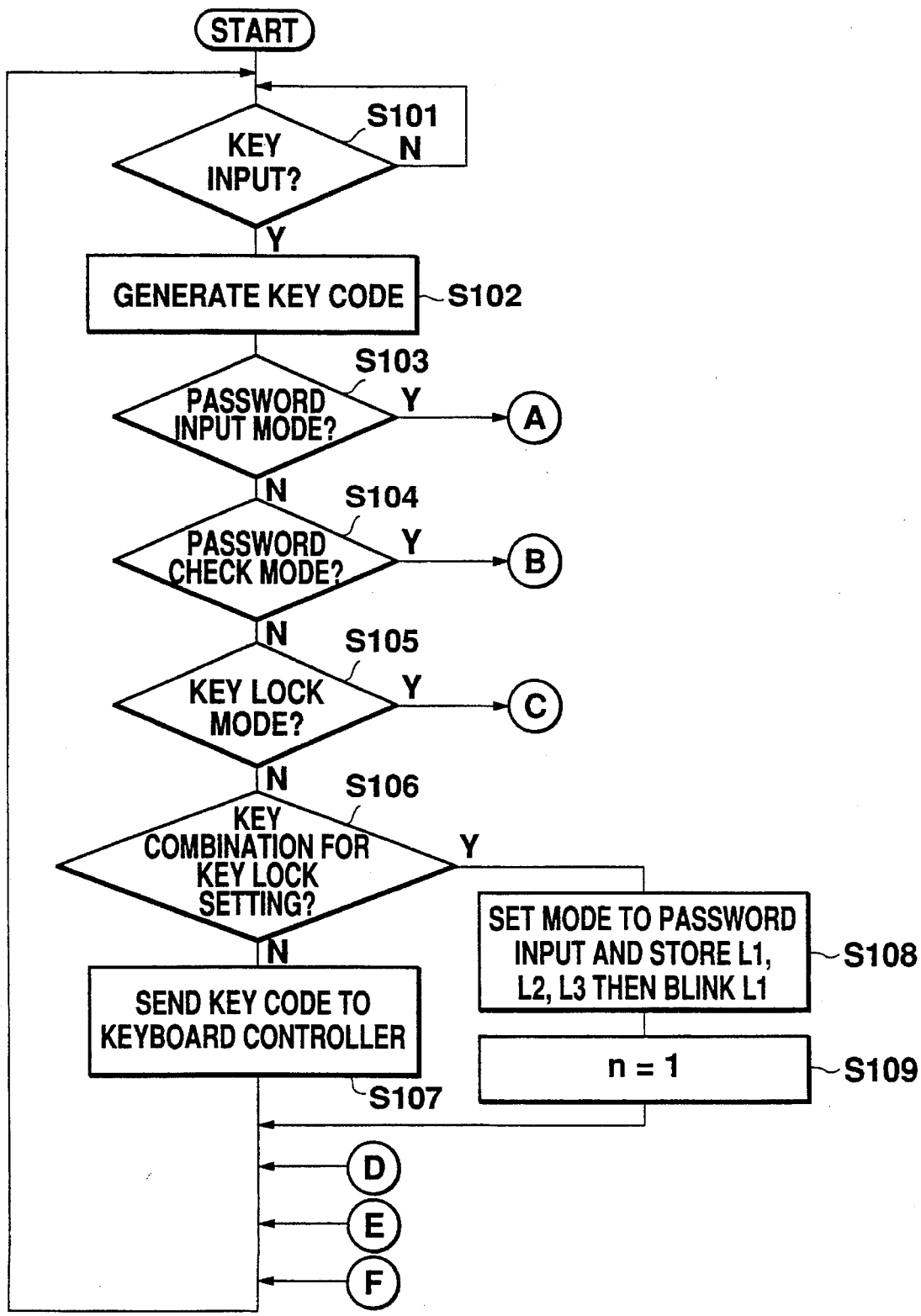
FIG. 2 is a flowchart showing an operation outline of the data input controller according to the invention.

After the third LED of the LED unit 18, L3, blinks and the key lock mode is entered, the keyboard encoder 17 still continues to monitor any key input through the keyboard 13 and generates the key code corresponding to the key input (step S102 in FIG. 2). At this time, the key lock mode is entered (step S105), thus the operation flow moves to the process shown in FIG. 5.

Figure 5:
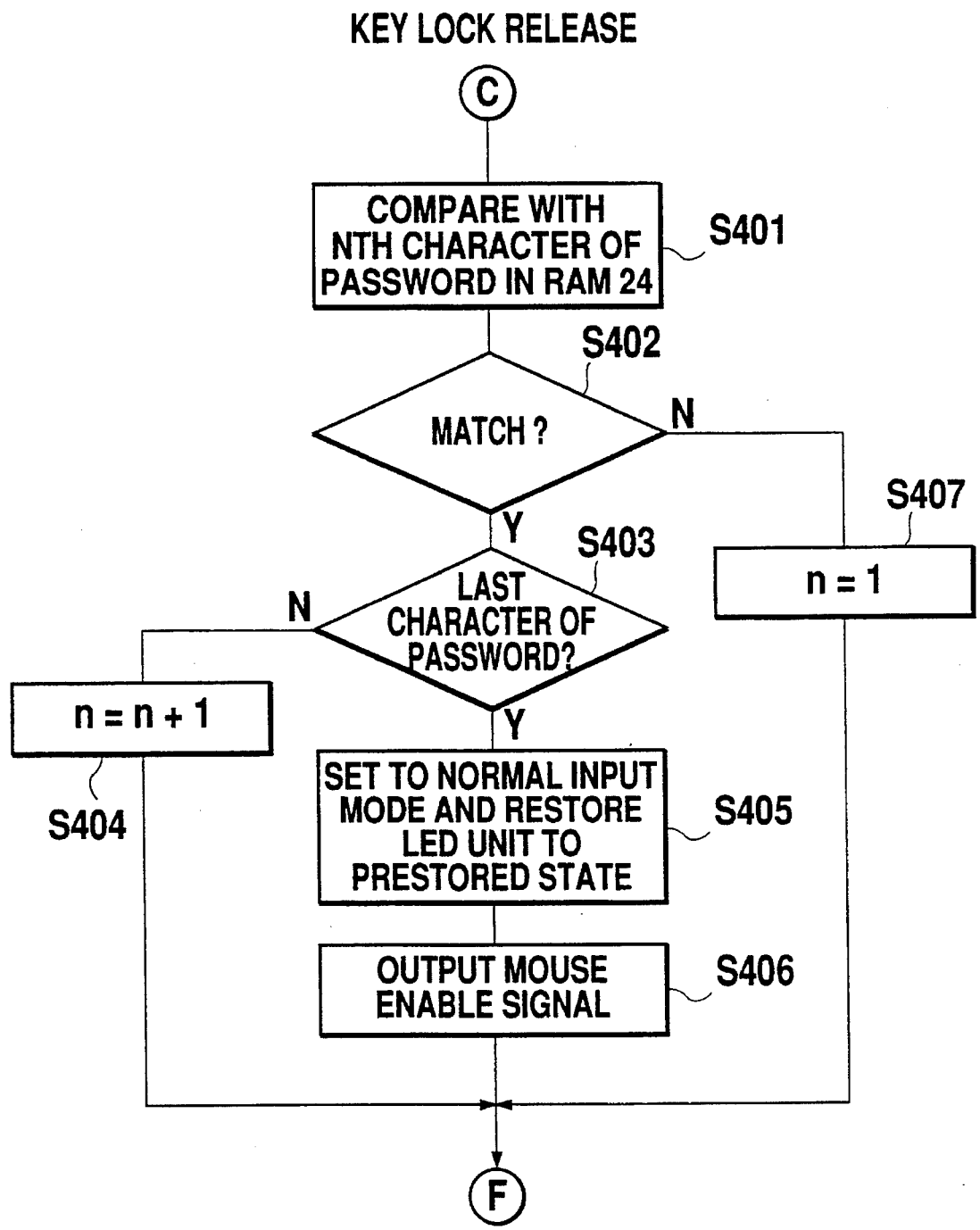
FIG. 5 is a flowchart showing key lock release operation.

In FIG. 5, the keyboard encoder 17 compares an entered key code with the nth character code of the password stored in the RAM 24 at step S401. If they match (Y at step S402), the keyboard encoder 17 determines whether or not the entered key code is the code corresponding to the ENTER key at step S403. If it is not the ENTER key, keyboard encoder 17 increments the variable n by one at step S404. A sequence of steps S101–S105 in FIG. 2 and steps S401–S404 in FIG. 5 are repeated.

When the ENTER key is pressed (Y at step S403), the keyboard encoder 17 recognizes that all the password characters match, then sets the mode to the normal input mode and turns off all LEDs of the LED unit 18 at step S405. At the same time, the keyboard encoder 17 sends a mouse enable signal 26b in FIG. 1 to the keyboard controller 16 at step S406.

On the other hand, if they do not match at step S402, the variable n is set to 1 at step S407. In this case, the operator may again enter the password from the beginning.

The keyboard controller 16, which receives the mouse enable signal 26b output at step S406, enables the function of sending an input through the mouse 14 to the CPU 11. The keyboard encoder 17 releases the key lock mode and sends an input normally through the keyboard 13 to the keyboard controller 16.

In the embodiment, key inputs, etc., can be inhibited locally by the keyboard encoder and the keyboard controller completely independently of the CPU 11 and without affecting the operation of the CPU 11. A password to release the key lock mode can also be set very easily.

Although the mouse inhibition signal 26a is output when the first and second passwords match at step S305 in FIG. 4, the signal may also be output when a specific key combination input is detected at step S106 in FIG. 2, for example, after step S108. Although the mouse 14 is connected to the keyboard controller 16, it may also be connected to the keyboard encoder 17, in which case the mouse inhibition signal 26a and mouse enable signal 26b become unnecessary.

Figure 6:
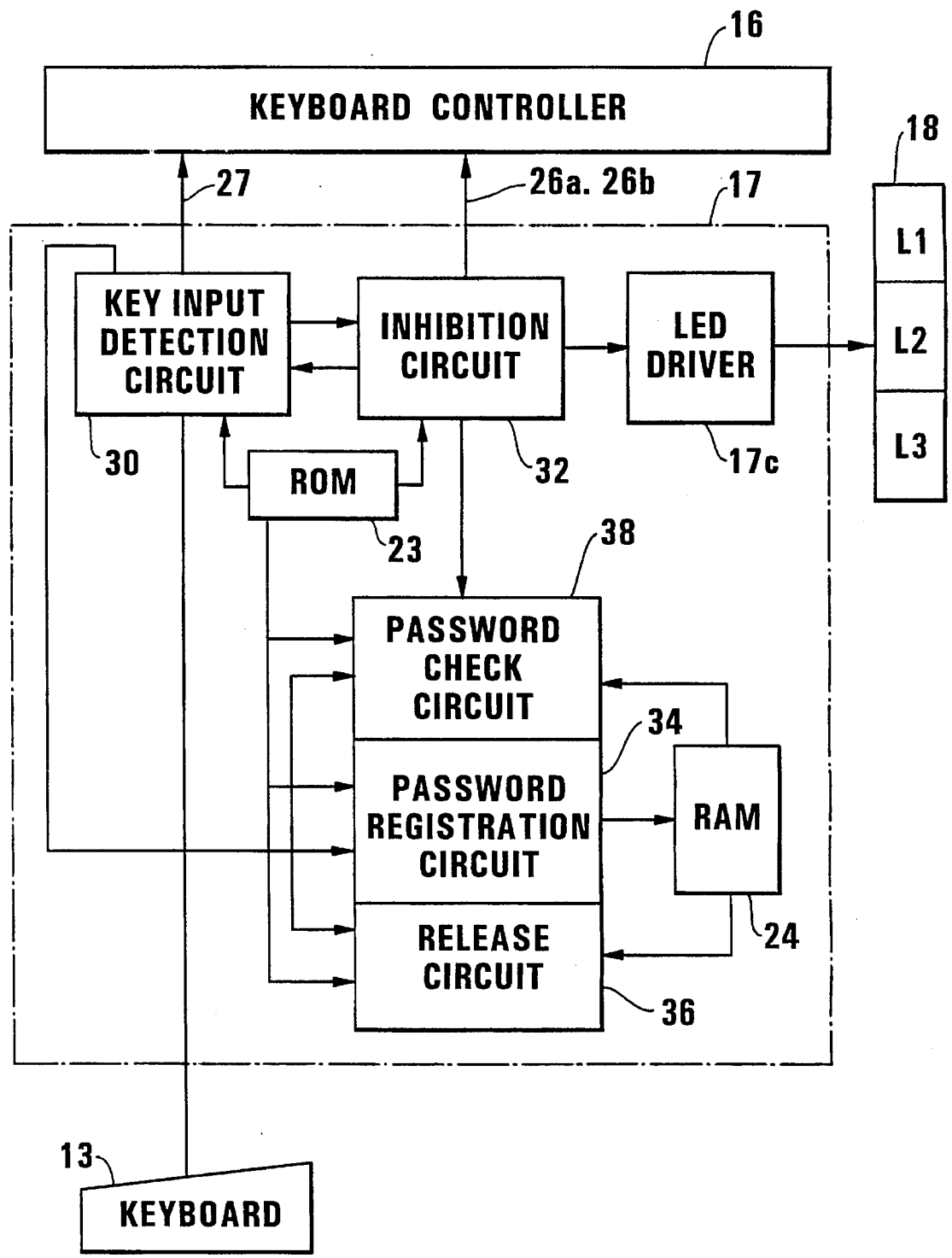
FIG. 6 is a block diagram showing the keyboard encoder.

According to one embodiment of the invention, shown in FIG. 6, there is provided a data input controller in an information processing apparatus comprising a central processing unit which controls the entire apparatus and performs various operations, a keyboard for entering data, and a data input controller 17 which controls sending of data corresponding to a key input through the keyboard to the central processing unit. The data input controller includes a key input detection circuit 30 for detecting whether or not a specific key combination is entered through the keyboard. An inhibition circuit 32 is coupled to the key input detection circuit 30 for inhibiting data from being sent to the central processing unit when the key input detection circuit detects the specific key combination.

A number of circuits are coupled to receive data from the key input detection circuit 30. A password registration circuit 34 registers as a password the data entered through the keyboard after data sending has been inhibited by the inhibition circuit 32. A release circuit 36 determines whether or not data entered through the keyboard matches the registered password if it is registered and, when they match, causes the inhibition circuit 32 to release the data sending inhibition state. A password check circuit compares a first data entered through the keyboard with second data entered through the keyboard after data sending is inhibited by the data sending inhibition circuit 32. Password data is stored in the RAM 24.

According to the invention, the data input controller is provided with means for detecting a specific key combination entered through the keyboard and when the specific key combination entry is detected, the key lock mode is set, then a password is registered. Thus, the keyboard can be set to the lock mode without affecting the operation state of the central processing unit.

According to the invention, the data input controller is provided with state indicator means for displaying the keyboard state, thus facilitating operations such as setting and releasing the key lock mode and setting a password.

According to the invention, the data input controller can disable inputs not only through the keyboard, but also through auxiliary input means such as a mouse.

According to the invention, when a password is set, the data input controller checks the password setting, thus trouble caused by an input mistake of the operator or erroneous recognition of the controller can be prevented at the time of password setting.

According to the invention, the encoder performs steps such as setting and releasing the key lock mode and setting a password, thus the encoder and the keyboard controller can be separated.

According to the invention, the encoder locks the keyboard and also sends a control signal to disable the function of the auxiliary input device to the keyboard controller for locking the auxiliary input device. Thus, regardless of whether the configuration is such that the encoder and the keyboard controller are separated or the auxiliary input device is connected to the keyboard controller, the keyboard and the auxiliary input device can be locked simultaneously.

What is claimed is:

1. An information processing apparatus comprising a central processing unit, a keyboard for entering data, and a data input controller which controls sending of data corresponding to a key input through the keyboard to the central processing unit, wherein said data input controller includes:

a key input detector for detecting whether or not a specific key combination is entered through said keyboard;

an inhibition circuit for inhibiting sending of data to said central processing unit when said key input detector detects the specific key combination entry;

a password registration circuit for registering as a password data entered through said keyboard after said inhibition circuit inhibits sending of data;

a password check circuit for determining whether or not data entered through said keyboard matches the registered password, and for maintaining the inhibition of the sending of data when the data entered and the registered password match each other, thereby establishing a key lock mode; and a release circuit for determining whether or not data entered through said keyboard matches the registered password in said key lock mode, and for releasing the inhibition of the sending of data and exiting the key lock mode when the data entered and the registered password match.

2. The data input controller as claimed in claim 1 further including state indicator means whose indicator state changes in response to said specific key combination entry and password registration.

3. The data input controller as claimed in claim 1 wherein said specific key combination detected by said key input detector contains a key not usually used for data input to said central processing unit.

4. An information processing apparatus comprising a central processing unit, a keyboard and an auxiliary input device for entering data, and a data input controller which controls sending of data corresponding to a key input through the keyboard or said auxiliary input device to the central processing unit, wherein said data input controller includes:

a key input detector for detecting whether or not a specific key combination is entered through said keyboard;

an inhibition circuit for inhibiting sending of data corresponding to an input through said keyboard or auxiliary input device to said central processing unit when said key input detector detects the specific key combination entry;

a password registration circuit for registering as a password data entered through said keyboard after said inhibition circuit inhibits sending of data;

a password check circuit for determining whether or not data entered through said keyboard matches the registered password, and for maintaining an inhibition on the sending of data when the data entered and the registered password match each other, thereby establishing a key lock mode; and a release circuit for determining whether or not data entered through said keyboard in said key lock mode matches the registered password, and when the data entered and the registered password match, for releasing the inhibition on the sending of data.

5. In an information processing apparatus comprising a central processing unit, a keyboard for entering data, and a data input controller which controls sending of data corresponding to a key input through the keyboard to the central processing unit, wherein said data input controller includes:

a key input detector for detecting whether or not a specific key combination is entered through said keyboard;

an inhibition circuit for inhibiting sending of data corresponding to an input through said keyboard to said central processing unit when said key input detector detects the specific key combination entry;

a password check circuit for comparing first data entered through said keyboard with second data entered through said keyboard after the sending of data is inhibited by said inhibition circuit;

a password registration circuit for registering said first data as a password when the first and second data match as a result of the comparison by said password check circuit; and a release circuit for determining whether or not data entered through said keyboard matches the registered password and when the data entered and the registered password match, for releasing the inhibition of the sending of data.

6. An information processing apparatus comprising a central processing unit, a keyboard for entering data, an encoder which encodes a key input through the keyboard, and a keyboard controller which controls sending of data encoded by the encoder to the central processing unit, wherein said encoder includes:

an inhibition circuit for inhibiting sending of said encoded data to said keyboard controller when a specific key combination entry is detected;

a password registration circuit for registering as a password data entered through said keyboard after said inhibition circuit inhibits sending of data;

a password check circuit for determining whether or not data entered through said keyboard matches the registered password, and for maintaining the inhibition of the sending of data when the data entered and the registered password match each other, thereby establishing a key lock mode; and a release circuit for determining whether or not data entered through said keyboard matches the registered password in said key lock mode and when the data entered and the registered password match, for releasing the inhibition of the sending of data.

7. An information processing apparatus comprising a central processing unit, a keyboard for entering data, an encoder which encodes a key input through the keyboard, a keyboard controller which controls sending of data encoded by the encoder to the central processing unit, and an auxiliary input device connected to the keyboard controller, wherein said encoder includes:

an inhibition circuit, responsive to a specific key combination entry, for inhibiting sending of said encoded data to said keyboard controller and for sending a control signal to disable an input through said auxiliary input device to said keyboard controller;

a password registration circuit for registering as a password data entered through said keyboard after encoded data sending is inhibited by said inhibition circuit;

a password check circuit for determining whether or not data entered through said keyboard matches the registered password, and when the data entered and the registered password match, for maintaining the inhibition of the sending of encoded data and for sending a control signal to said keyboard controller to disable input through said auxiliary input device to establish a key lock mode; and a release circuit for determining whether or not data entered through said keyboard in said key lock mode matches the registered password and when the data entered and the registered password match, for releasing the inhibition of the sending of the encoded data and for sending the control signal to enable the input through said auxiliary input device to said keyboard controller.

8. An information processing apparatus comprising a central processing unit, a keyboard and an auxiliary input device for entering data, and a data input controller which controls sending of data corresponding to a key input through the keyboard to the central processing unit, wherein said data input controller includes;

a key input detector for detecting whether or not a specific key combination is entered through said keyboard;

an inhibition circuit for inhibiting sending of encoded data corresponding to an input through said keyboard to said central processing unit when said key input detector detects the specific key combination entry;

a password check circuit for comparing first data entered through said keyboard with second data entered through said keyboard after the sending of encoded data is inhibited by said inhibition circuit;

a password registration circuit for registering said first data as a password and disabling an input through said auxiliary input device when a comparison performed by said password check circuit determines that said first data and said second data match; and a release circuit for determining whether or not data entered through said keyboard matches the registered password and when the data entered and the registered password match, for releasing an inhibition of the sending of the encoded data and for sending a control signal to enable an input through said auxiliary input device to said keyboard controller.

* * * * *